United States Patent Office  3,716,566
Patented Feb. 13, 1973

3,716,566
METHOD OF DECOMPOSITION AND/OR WET INCINERATION OF ORGANIC MATERIAL, ESPECIALLY BIOLOGICAL SUBSTANCES
Bruno Otto Sansoni, Lohhof-Sud, and Wolfgang Karl Heinrich Kracke, Munich, Germany, assignors to Gesellschaft fur Strahlenforschung m.b.H., Neuherberg, Germany
No Drawing. Filed June 18, 1969, Ser. No. 834,526
Claims priority, application Germany, July 2, 1968, P 17 73 750.7
Int. Cl. C09f 5/00
U.S. Cl. 260—412.8                                   11 Claims

ABSTRACT OF THE DISCLOSURE

A method of decomposition and/or wet incineration of organic substances such as meat, fish, flour, bone, vegetables, milk powder, cellulose, ion exchange resins or the like. The substances are decomposed in aqueous suspension by subjecting them to attack of the radicals $\cdot OH$ or $\cdot HO_2$.

---

The invention relates to a method of decomposition and/or wet incineration of organic material, especially of biological substances such as meat, fish, milk, flour, vegetables, bones, feces, urine and other organic substances such as sugar, cellulose or ion exchange resins.

For removal as well as analysis of this kind of substances with respect to inorganic constituents or radionuclides it is known that dry or wet incineration is employed first to reduce their volume and remove disturbances resulting from the organic matrix. For both applications, care must be taken during decomposition or incineration not to cause the toxic or radioactive substances to volatilize, i.e. the tracer elements Fe, Pb, Hg, Cd, As, Zn, or radionuclides such as Cs 137, Na 22, Ru 106 contained in the substances and to be analyzed.

Hence, dry incineration is carried out frequently in an oxygen deficient atmosphere to keep the combustion temperatures correspondingly low. Some of the disadvantages of this method are the loss of volatile elements or radionuclides, the long working time, obnoxious smells, the limited quantities that can be sampled at a time, and the danger of local overheating of the sample with resulting partial volatilization. Carbon residues that cannot be ignited without leaving a residue often must be wet incinerated in addition. Traces of elements can be burnt into the material of the crucible and get lost. Potential radioactive off-gases must be carefully decontaminated of Cs 137, Ru 106, C 14, H 3 and others in a filter system. The incineration systems this requires are not available in a standard laboratory.

In the methods of wet incineration known so far the organic substance is oxidized by strongly oxidizing concentrated acids, mainly $HNO_3$, $HNO_3/H_2SO_4$, $HNO_3/HClO_4$. These additionally decompose the organic molecules by dehydration at elevated temperatures around 100–300° C. However, also these methods have the disadvantage of very obnoxious smells resulting from escaping acid fumes and of only relatively small quantities being decomposable in one batch. Many traces of elements volatilize also in this case, e.g., as chlorides. There may be sulfate precipitates which disturb the continued processing of residues. The ashes obtained of a dark red color frequently require subsequent treatment with, e.g., $H_2O_2$ for brightening. The large quantities of acid needed can introduce traces of impurities. Occasionally, the action of sulfuric acid at higher temperatures may result in the formation of resistant compounds, e.g., sulfonic acids. Because of its explosiveness, perchloric acid can be handled safely only under extensive precautions. To avoid dilution of acids, the substance to be incinerated must be pre-dried in most cases.

Hence, the invention has the purpose of developing a method of decomposition and wet incineration of organic, especially biological substances which is capable of processing also large quantities of substance in one batch, in addition in series operation, under mild conditions, possibly without any loss of traces and in any chemical laboratory without additional equipment.

The problem of the invention is solved by exposing the substance in aqueous suspension to the attack of radicals such as $\cdot OH$, or $\cdot HO_2$. These radicals will be added to organic molecules in a rather easy and general way. In this process, the latter molecules are either decomposed by oxidation at the same time, or addition compounds are formed which, in turn, can readily be oxidized.

Hydrogen peroxide has turned out to be a particularly suitable supplier of radicals. If traces of iron(II) salts (also iron(III), less effective are Cu(II) and others) or ferments such as catalase, also hemin, are added to its aqueous solution, $\cdot OH$ radicals or their complexes will be formed catalytically with the metal ion out of hydrogen peroxide:

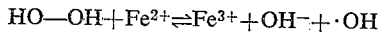

In an analogous way, $\cdot HO_2$ radicals will be formed with traces of $Ce^{4+}$ (cf. W. A. Waters, Mechanisms of Oxidation of Organic Compounds, Methuen's Monographs on Chemical Subjects, 1963). One special advantage of the reagent $H_2O_2$ is the fact that the only by-products produced are water and escaping oxygen, e.g. in the reaction

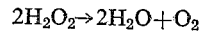

Moreover, it leaves no salt residue except for traces of the stabilizer. It is relatively inexpensive and commercially available in a very pure form.

Below, the method according to the invention is explained in greater detail by the example of the radicals from the reagent $H_2O_2/Fe^{2+}$:

The substance to be decomposed or incinerated is crushed, heated with a hydrogen peroxide solution; then, after addition of a trace of iron(III) salt, the spontaneous main reaction is expected, and the substance is slowly evaporated to dryness. Then, some more hydrogen peroxide is added, evaporated, and this is repeated until a purely inorganic ash contaminated only by iron additions and ammonium salts remains as the residue. A quick method frequently sufficient is a shorter single treatment with the reagent if the inorganic and radioactive constituents, respectively, are separated afterwards from the solution obtained. In both cases, fat disturbing the process is removed best by extraction or separation with suitable organic solvents. The method has been employed for decomposition and wet incineration, respectively, of meat, fish, liver, bone, vegetables, dried and fresh milk, cocoa, hay, wool, cellulose, sugar, ion exchange resins, dried blood, urine, feces, carcasses of mice and rats.

The new method has several major advantages over the previously used processes of dry and wet incineration:

It allows the decomposition and wet incineration also of large quantities of substance up to one kg. of substance in one batch, even in the open beaker. The working time required, for the decomposition of, e.g., meat, fish, flour, dried milk, ion exchange resins, urine, feces or animal carcasses is several orders of magnitude shorter than the time required for the usual dry incineration. This makes it possible for the first time to use routine radiochemical methods afterwards in quick radioactivity assays of foodstuffs and other biological material. Time-consuming pre-drying of the substance is no longer necessary. The only by-products of hydrogen peroxide are water and oxygen, which escapes. This avoids the obnoxious smell resulting from combustion gases or aggressive fumes associated with the methods used up to now. It also avoids the necessity for special installations, such as acid hoods or afterburners.

This, in turn, makes it possible to carry out major series of experiments in routine operation and to use also unskilled auxiliary personnel because of the relatively small amount of supervision required.

Another significant advantage of the invention relative to the methods known so far lies in the much milder experimental conditions. Thus, the low working temperature of $\leq 100°$ C. strongly reduces the volatilization of tracer constituents. Moreover, incineration can be carried out not only in a strongly acid but also in a neutral aqueous medium. This has a better effect on acid or alkali-sensitive components during the decomposition step. If necessary, it is possible after previous fat extraction to work also in a weakly alkaline medium.

Hydrogen peroxide is commercially available in a very pure form. This reduces any uncontrolled introduction of trace impurities. Frequently, inexpensive technical-grade hydrogen peroxide will do already.

The method according to the invention can be used equally for waste removal, especially with respect to radioactively contaminated material, and on analytical problems. The intention is to reduce to a minimum the initial volume of material, in the first case for reasons of transport, storage costs and safety, in the latter case for concentration of the tracer constituents to be analyzed and for removal of disturbances due to the organic substance.

Now, for some examples:

(1) As a general working outline, e.g., 100 g. of chopped fresh meat is treated with 300 ml. of 30% hydrogen peroxide (perhydrol). A quantity of iron(II) salt is added to the suspension until the solution is about 0.001M in iron. In the case of meat, its natural iron content is often sufficient. Then the substance is carefully heated until the main reaction starts around 80–90° C. It is characterized by a stronger gas formation. Now, the beaker is taken from the heating plate and the rising foam is dissipated with the glass rod without disturbance of the solution. After the main reaction has died down, the substance is slowly evaporated. After some 45 minutes, the meat has been decomposed into a yellow solution. Emulsified or supernatant fat is extracted with suitable organic solvents (e.g. trichloro ethylene) and the aqueous phase is evaporated almost to dryness. Before carbonization begins, some more perhydrol is added, evaporated again, and this is repeated several times. Finally, a white residue of about 3 g. remains only weakly colored by the added iron. After sublimation of the ammonium salts it is only 1 to 1.5 g. of ignition residue. This roughly corresponds to the theoretical ash content of the grade of meat used.

(2) In a similar way, 1 kg. of venison was decomposed into 18 g. of residue consisting mainly of fat with 1.5 l. of reagent solution in about 4 hours. However, already after 45 minutes of decomposition time and subsequent fat extraction it was possible, after addition of carrier substance, to separate cesium 137 from the yellow decomposition solution by ion exchange on $K_2[CoFe(CN)_6]$ and to identify and assess it in the NaI well crystal, by gamma spectrometry after only 40 minutes of measuring time. The radiochemical yield for the separation of Cs 137 in this case was in excess of 90–95 percent. This quick method takes but two hours of working time up to the finished gamma spectrum. In a corresponding way, it is possible also to separate and subsequently measure beta and alpha emitters from the biological material in a quick method.

(3) 303 g. of fish (one whole mackerel in a piece) (500 ml. of 30% $H_2O_2$, 8 hours; 10 g. of residue with 32% ignition loss).

(4) 100 g. of cattle liver (400 ml. of $H_2O_2$, 5 hours; 1.4 g. of residue with 14% of ignition loss).

(5) 155 g. of calf bone (500 ml. of $H_2O_2$, 16 hours; 56 g. of residue with 8% ignition loss).

(6) Cabbage (one whole head of 1.856 kg.) (in a beaker of 10 l.; 1.7 l. of $H_2O_2$, 16 hours; 22 g. of residue with 27% of ignition loss).

(7) 50 g. of dried milk powder (500 ml. of $H_2O_2$, 4 hours; 3.8 g. of residue with 28% ignition loss).

(8) 50 g. of cocoa, free from oil (400 ml. of $H_2O_2$, 5 hours; 6 g. of residue with 60% ignition loss).

(9) 50 g. of hay (500 ml. of $H_2O_2$, 8 hours; 8.5 g. of residue with 60% ignition loss).

(10) 25 g. of dried blood (470 ml. of $H_2O_2$, 5 hours; 0.4 g. of residue with 31% ignition loss).

(11) 160 g. of urine (150 ml. of $H_2O_2$, 4–5 hours; 4 g. of residue with 18% ignition loss).

(12) 77 g. of feces (300 ml. of $H_2O_2$, 5 hours; 3 g. residue with 18% ignition loss).

(13) 50 g. of wool (700 ml. of $H_2O_2$, 20 hours; 5.5 g. of residue with 88% ignition loss).

(14) 45 g. of filter paper (cellulose) (1.2 l. of $H_2O_2$, 16 hours; 4.7 g. of residue with 53% ignition loss).

(15) 50 g. of cation exchanger Dowex 50 WX 1 (50–100 mesh) loaded with $Fe^{2+}$ ions. After addition of 100 ml. of 30% $H_2O_2$ at 20° C. dissolution into a clear brown liquid after half a minute.

Meat, flour, feces, urine, animal fat, and ion exchange resins lend themselves particularly well to decomposition. If the sample to be decomposed already contains the catalyst, it is not necessary to add this in advance, e.g. meat, feces, or ion exchange resins loaded with $Fe^{2+}$. Urine can be evaporated without adverse foaming.

For removal of biological wastes the method according to the invention has the great advantage that, e.g., animal carcasses can be treated by wet incineration without obnoxious smell of acid fumes or combustion gases in a standard hood, even in an open beaker, at temperatures of $\leq 100°$ C. with only a small amount of supervision and within a relatively short period of time. The costs of heating and technical-grade hydrogen peroxide are relatively low. However, fat will be decomposed only at a slow rate, but it is possible to saponify the residual fat with aqueous or alcoholic lye and transfer it into the respective solid lime soap through the addition of calcium oxide very quickly. This solidifies into a solid black block which can easily be welded into polyethylene and stored in steel drums requiring but little space.

For example, the carcasses of about 120 mice (fresh weight 2.1 kg.) were processed in an open 10 l. beaker with 3 l. of 30% hydrogen peroxide in 16 hours with only occasional supervision; the residue was 700 g. of solid lime soap (volume 450 ml.). This corresponds to a volume reduction by about a factor of ten. The costs of the hydrogen peroxide in this case amounted to DM 3.60, which corresponds to some DM 1.70/kg. In a similar way, the carcass of a rat of 350 g. live weight was processed into a residue of 110 g. of solid lime soap (volume 60 ccm.) within 5 working hours with 550 ml. of 30% hydrogen peroxide. The costs of perhydrol in this case were DM 0.66, corresponding to about 1.88/kg. In addition to the low costs of hydrogen peroxide there are the costs of heating, storing and working time.

After a brief training period these steps can be performed also by unskilled personnel.

The use of the new method of decomposition and incineration with $H_2O_2/Fe^{2+}$ thus is a considerable advance also in the removal of radioactive animal carcasses.

What is claimed is:

1. Method of decomposition and wet incineration of organic substances such as meat, fish, flour, bone, vegetables, milk powder, cellulose, and ion exchange resin comprising decomposing the substances in aqueous suspension by attack of a radical selected from the group consisting of $\cdot OH$ and $\cdot HO_2$.

2. Method as claimed in claim 1, wherein $H_2O_2$ is added to the substances in the presence of a catalyst for forming at least one of said radicals from said $H_2O_2$.

3. Method as claimed in claim 2, wherein iron(II) or iron(III) salt is added as a catalyst.

4. Method as claimed in claim 1, wherein at least a part of the reaction products are evaporated.

5. Method as claimed in claim 4, comprising step-wise evaporation of the reaction products and subsequent addition to the residue of new radical suppliers up to complete incineration of the substances.

6. Method as claimed in claim 4, comprising subsequent ignition of the substances evaporated.

7. Method as claimed in claim 1, further comprising the separation of ingredients, the presence of which is to be determined, from the decomposition solution resulting from said attack.

8. Method as claimed in claim 1, further comprising the separation of fat from the solution resulting from said attack.

9. Method as claimed in claim 1, $H_2O_2$ being added to said suspension, said substances containing, as a natural ingredient, catalyst for forming at least one of said radicals from $H_2O_2$.

10. Method as claimed in claim 1, said substances being radionuclide-containing animal carcasses.

11. Method as claimed in claim 1, the decomposing comprising mixing meat and 30% hydrogen peroxide in the approximate proportion 100 g. meat to 300 ml. peroxide, adding to the mixture sufficient iron (II) to bring the aqueous solution of meat and peroxide to about 0.001 M in iron, heating the solution to around 80 to 90° C. to bring about a main reaction characterized by stronger gas evolution, ceasing heating and dissipating the resulting foam without disturbance of the solution, evaporating after the main reaction has died down, and extracting fat from the solution.

References Cited

UNITED STATES PATENTS

| | | | |
|---|---|---|---|
| 2,702,228 | 2/1955 | Kahler et al. | 260—212 |
| 2,716,058 | 8/1955 | Rapson et al. | 260—212 |
| 3,340,282 | 9/1967 | Taylor | 260—412 |
| 3,491,080 | 1/1970 | Ehrensvard et al. | 260—412 |

LEWIS GOTTS, Primary Examiner

J. R. BROWN, Assistant Examiner

U.S. Cl. X.R.

210—59; 260—2.1, 212, 412.5, 412